US006848065B1

(12) United States Patent
Nilsson

(10) Patent No.: US 6,848,065 B1
(45) Date of Patent: Jan. 25, 2005

(54) BIT ERROR RATE ESTIMATION

(75) Inventor: Johan Nilsson, Malmö (SE)

(73) Assignee: Telefonaktiebolaget LM Ericsson (publ) (SE)

(*) Notice: Subject to any disclaimer, the term of this patent is extended or adjusted under 35 U.S.C. 154(b) by 464 days.

(21) Appl. No.: 09/598,210

(22) Filed: Jun. 21, 2000

(51) Int. Cl.[7] .................................................. G06F 11/00
(52) U.S. Cl. .......................... 714/704; 714/795; 455/69; 455/522; 375/262; 375/341
(58) Field of Search ................................ 714/704, 262, 714/265, 344, 786, 794–795; 348/462; 455/522, 69, 67, 13; 375/225, 340, 262, 265, 341

(56) References Cited

U.S. PATENT DOCUMENTS

| 4,291,403 | A | * | 9/1981 | Waddill et al. ............. 714/704 |
| 5,241,563 | A | * | 8/1993 | Paik et al. .................. 375/262 |
| 5,301,209 | A | * | 4/1994 | Wei ............................. 375/265 |
| 5,406,562 | A | * | 4/1995 | Roney, IV ................... 714/704 |
| 5,453,997 | A | * | 9/1995 | Roney, IV ................... 714/774 |
| 5,828,672 | A | * | 10/1998 | Labonte et al. ............. 714/708 |
| 5,838,697 | A | * | 11/1998 | Abe ............................ 714/708 |
| 6,141,388 | A | * | 10/2000 | Servais et al. .............. 375/262 |
| 6,163,571 | A | * | 12/2000 | Asokan et al. ............. 375/225 |
| 6,275,485 | B1 | * | 8/2001 | Padovani .................... 370/342 |
| 6,320,850 | B1 | * | 11/2001 | Perahia et al. ............. 370/316 |
| 6,526,531 | B1 | * | 2/2003 | Wang ........................... 714/704 |
| 2001/0036812 | A1 | * | 11/2001 | Engstrom ..................... 455/63 |

FOREIGN PATENT DOCUMENTS

| EP | 0600095 A1 | | 6/1994 | |
| JP | 0600095 A1 | * | 6/1993 | .......... H03M/13/12 |
| WO | WO 96/26583 | * | 8/1996 | ............. H04L/1/20 |
| WO | WO98/49800 | | 11/1998 | |
| WO | WO99/49610 | | 9/1999 | |
| WO | WO 99/49610 | * | 9/1999 | ............. H04L/1/12 |
| WO | WO00/33504 | | 6/2000 | |

OTHER PUBLICATIONS

"Q1900: Viterbi/Trellis Decoder", Feb. 1997, Qualcomm, p. 17–20.*
Shu Lin, "Error Control Coding: Fundamentals and Applications", 1983, p. 1–3.*
Stephen Wicker, "Error Control Systems for Digital Communication and Storage", 1995, pp. 424–427.*
Nedo Celandroni, et al., "Quality Estimation of PSK Modulated Signals," IEEE Communications Magazine, Jul. 1997, vol. 35, No. 7, pp. 50–55.

* cited by examiner

Primary Examiner—Guy J. Lamarre
(74) Attorney, Agent, or Firm—Burns, Doane, Swecker & Mathis, LLP

(57) ABSTRACT

A bit error rate estimate is generated for a received signal. This involves using an error correction decoding technique to generate a block of decoded bits from the received signal, and using an error detection technique to determine whether at least one of the decoded bits from the block of decoded bits has an erroneous value. If none of the decoded bits from the block of decoded bits has an erroneous value, then the bit error rate estimate is calculated from the received signal. Otherwise, the bit error rate estimate is set equal to a value that is based on a previously calculated bit error rate. This may be further refined by using a predetermined value in place of a value based on the previously calculated bit error rate if it is detected that a number of consecutively received blocks were received with non-correctable errors.

18 Claims, 3 Drawing Sheets

BIT ERROR RATE ESTIMATION

BACKGROUND

The present invention relates to telecommunications systems, and more particularly to bit error rate estimation in telecommunications systems.

Increasingly, modern telecommunications systems employ digital signal processing techniques to communicate information from a sender to a recipient. In such systems, the information to be communicated is represented as a series of binary digits (bits). These information bits are communicated from a sender to a receiver. Depending on the type of information being conveyed, the received information bits may be immediately usable in their digital format (e.g., where the information is of a type that originates in a digital format, such as an application program to be run by a computer processor or a document created by a word processor). In other cases, the received information may represent information that originated in analog form, such as voice information that is sensed by a microphone for the purpose of being communicated in a telephone call. In such cases, the analog signal must first be converted to a digital format prior to transmission. At the receiving end, the received information bits must first be converted back into an analog form before it can be used by the receiver (e.g., by applying the analog signal to a speaker that recreates the sound of a far-end user's voice). Such techniques are well-known, and need not be described here in further detail.

The medium through which a signal propagates as it travels from a sender to a receiver is called a channel. For example, in radiocommunication systems, the channel is the air and other obstacles through which the electromagnetic signal travels from a transmitting antenna to a receiving antenna. Because the channel is often not an ideal vehicle for propagating the signal (e.g., different parts of the transmitted electromagnetic signal may reflect off of different objects, resulting in so-called multi-path propagation; also, the signal may experience fading), transmission over a channel can distort the signal. This distortion, in turn, can result in the receiver receiving information bits that do not exactly match the information bits that were transmitted by the sender. Consequently, techniques are applied to enable the detection and possible correction of bit errors.

Looking first at error detection techniques, these involve, at the sending side, the generation of special error detection bits that are calculated based on the information bits to be transmitted. Error detection bits may be in the form of cyclic redundancy check (CRC) bits, parity bits, or any other bits generated as a function of the information bits in accordance with other error detection techniques. The sender transmits the information bits along with the calculated error detection bits. At the receive side, the receiver uses the same error detection technique to generate expected error detection bits from the received information bits. The expected error detection bits are then compared to the actually received error detection bits. If they match, then the information bits were likely received without error. If the expected and received error detection bits do not match, however, then an error occurred in transmission, and appropriate steps should be taken.

Error correction techniques are also known. For example, in mobile communications systems, so called "forward error correction" (FEC) coding techniques are often applied at the transmitter, which add additional bits to the transmission bit stream. These additional bits are not only capable of indicating whether an error exists in the received bit stream, but they also carry information about what the correct values should be. Consequently, the receiver uses these additional bits to more accurately reconstruct the transmitted bit stream, even if one or more errors occurred during the transmission. For example, block coding techniques may be employed that, for example, break the information to be transmitted up into fixed-sized blocks and replicate each bit a predetermined number of times. For example, in a so-called (3, 1) code, each bit to be transmitted is replicated two more times, so that it is transmitted a total of three times. It is apparent that transmitting all of this expanded number of bits takes more time than merely transmitting the unencoded bit stream. However, the benefit is achieved at the receiver, which can, for example, use a Viterbi decoder to select a most-likely unencoded bit on the basis of the three coded bits. The most-likely unencoded bit in this case can be the value represented by at least two of the three received coded bits. Thus increased transmission accuracy is achieved at the expense of throughput.

However, error correction coding is not infallible. A very poor quality channel could, in the above example, cause at least two of the received coded bits to take on the wrong value, in which case the receiver would wrongly decide on the "most-likely" value of the decoded bit. To reduce the likelihood of a transient channel condition, such as a deep fade, from similarly affecting all of the coded bits that represent a same underlying non-coded bit, techniques such as interleaving are applied at the transmitter, which redistribute the coded bits such that coded bits corresponding to a same underlying non-coded bit will not be transmitted in succession, but will instead be spaced apart in time, with other coded bits being transmitted in-between. At the receiver, deinterleaving should be applied to properly re-order the bits so that decoding can take place.

Despite the use of such techniques, the quality of the channel can nonetheless be such that some of the received information bits are erroneous, even after error correction has been performed by the receiver. For this reason, error detection techniques are often used in combination error correction techniques. That is, at the transmitter, error detection bits calculated from underlying information bits are added to the bit stream, and error correction coding is then applied on this larger bit stream. At the receiver, the reverse processes are performed, so that the error detection process serves to indicate whether errors in the decoded information bits remain, despite the use of error correction.

As explained above, the decoded information bits can include one or more errors, despite the use of interleaving and error correction coding/decoding. Depending on the application, a certain number of bit errors per unit of time may be tolerable, such as where the information bits represent voice information carried over a cellular telephone call. In such cases, errors may cause the quality of the sound to degenerate, but the sound reproduced from this erroneous bit stream may nonetheless be acceptably recognizable to the listener. At or above a particular level however, the bit error rate becomes unacceptable because the amount of audio distortion may make the received speech difficult to understand.

One measure of the quality of transmission is the Bit Error Rate (BER), which represents how many erroneous bits are received per block or unit of time. In many communications systems, actions that can be taken when the BER becomes too large to provide acceptable service include retransmitting the information (e.g., retransmitting the erroneously received block of bits), and/or taking steps to reduce the BER in future transmissions. For example, in the case of mobile radio communications, it may be possible to improve (i.e., reduce) the BER by increasing the transmit power level used by the transmitter. Increasing the transmit power for one user can be expected to increase interference levels for other users, however, so power control mechanisms in communication systems such as cellular communication systems typically use a quality measure like BER as feedback for maintaining transmit power levels at minimum levels necessary to maintain a desired quality of service.

FIG. 1 is a block diagram showing a conventional system for generating a BER estimate. At a transmitter, data to be transmitted is supplied to coding and interleaving logic 101, which generates interleaved FEC bits as described above. These bits are imposed onto a signal (e.g., by means of binary phase shift keying, BPSK) that is propagated through a channel 103. At a receiver, the received signal 105 is supplied to decoding and deinterleaving logic 107, which performs deinterleaving and error correction decoding as described above to generate a stream of decoded bits ("Received Data") 109. The decoded bits 109 are supplied to other circuitry (not shown) in the receiver which uses them for their intended purpose (e.g., generating a loudspeaker signal in a mobile communication device). For purposes of generating the BER estimate, the conventional system also supplies the decoded bits 109 to coding and interleaving logic 111 that essentially duplicates the process performed by the transmitter's coding and interleaving logic 101, except that the receiver performs these operations on the decoded bits 109.

In parallel with the receiver's decoding and deinterleaving logic 107 and coding and interleaving logic 111, the received signal 105 is supplied to raw decoding logic 113, which merely generates 1's and 0's from the received signal 105, but does not perform any error correction or deinterleaving. The output bit stream supplied by the raw decoding logic 113 is then supplied to one input of comparison logic 115. Another input of the comparison logic 115 receives the output bit stream supplied by the receiver's coding and interleaving logic 111. The comparison logic 115 calculates, for a given length input bit stream, bow many differences there were between the values supplied by the receiver's coding and interleaving logic 111 and the raw decoding logic 113. This count represents the BER estimate.

The conventional technique for estimating the BER is flawed in that it relies on the decoded bits 109 being entirely accurate. That is, the technique of comparing the output of the receiver's coding and interleaving logic 111 with the output of the raw decoding logic 113 assumes that the output of the receiver's coding and interleaving logic 111 is entirely accurate, so that any differences between it and the output of the raw decoding logic 113 is an accurate measure of how many errors occurred. However, the output of the receiver's decoding and deinterleaving logic 107 will only be correct if the supplied decoded bits 109 are correct, and this is not always the case. As a result, whenever the decoding and deinterleaving logic 107 generates an erroneous stream of decoded bits 109, so too will the receiver's coding and interleaving logic 111. This only multiplies the error. Consider, for example, a system that uses a (3,1) block code that replicates each underlying information bit. For each one erroneous bit that is supplied at the input of the receiver's coding and interleaving logic 111, three erroneous bits will be generated at the output. These will then be compared with a similarly erroneous bit stream generated by the raw decoding logic 113. That is, the non-correctable errors will not only be found in the bit stream generated by the coding and interleaving logic 111, but also in the bit stream generated by the raw decoding logic 113. As a result, the BER in this case will be grossly underestimated.

If a different type of coding had been specified in the above example, such as convolutional or turbo coding, then the BER would have been grossly overestimated instead of underestimated. The reason in this case is that with convolutional coding or turbo coding, one changed (i.e., erroneous) bit in the sequence 109 can completely change the sequence generated by the coding and interleaving logic 111.

In any case, the BER estimate that is calculated when the block of decoded bits includes errors can be very far from correct. Such an over- or under-estimation of BER can be catastrophic under these circumstances, because the system is likely to take inappropriate responsive power control measures. For example, where the BER has been overestimated, the transmitter power may be needlessly boosted to levels that cause excessive interference to other receivers. Alternatively, where the BER has been under-estimated, the system may conclude that the BER is within acceptable levels that require no intervention, when, in reality, steps should be taken to improve the transmission conditions and thereby reduce the BER.

Thus, there is a need to provide techniques and apparatuses for generating BER estimates that take into account the presence of erroneous bits in a received data stream.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that generate a bit error rate estimate for a received signal. This includes using an error correction decoding technique to generate a block of decoded bits from the received signal; and using an error detection technique to determine whether at least one of the decoded bits from the block of decoded bits has an erroneous value. If none of the decoded bits from the block of decoded bits has an erroneous value, then the bit error rate estimate is calculated from the received signal. Otherwise, if at least one of the decoded bits from the block of decoded bits has an erroneous value, then the bit error rate estimate is set equal to a value that is based on a previously calculated bit error rate.

Setting the bit error rate estimate equal to the value that is based on the previously calculated bit error rate may comprise setting the bit error rate estimate equal to a value that is equal to the previously calculated bit error rate. Alternatively, it may comprise setting the bit error rate estimate equal to a value that is predicted from one or more previously calculated bit error rates.

To further solve bit error rate estimation problems that can arise when very poor channel conditions cause many consecutive blocks to be received with non-correctable errors, setting the bit error rate estimate equal to the value that is based on the previously calculated bit error rate if at least one of the decoded bits from the block of decoded bits has an erroneous value may comprise setting the bit error rate estimate equal to a predetermined value that is not based on the previously calculated bit error rate if the block of decoded bits is at least an nth consecutively received block of decoded bits having at least one decoded bit that has an erroneous value, wherein n is a number greater than one; and otherwise setting the bit error rate estimate equal to the value that is based on the previously calculated bit error rate if at least one of the decoded bits from the block of decoded bits has an erroneous value.

The predetermined value may advantageously be set greater than or equal to a reference value used in a power control algorithm.

BRIEF DESCRIPTION OF THE DRAWINGS

The objects and advantages of the invention will be understood by reading the following detailed description in conjunction with the drawings in which.

DETAILED DESCRIPTION

Figure 1:
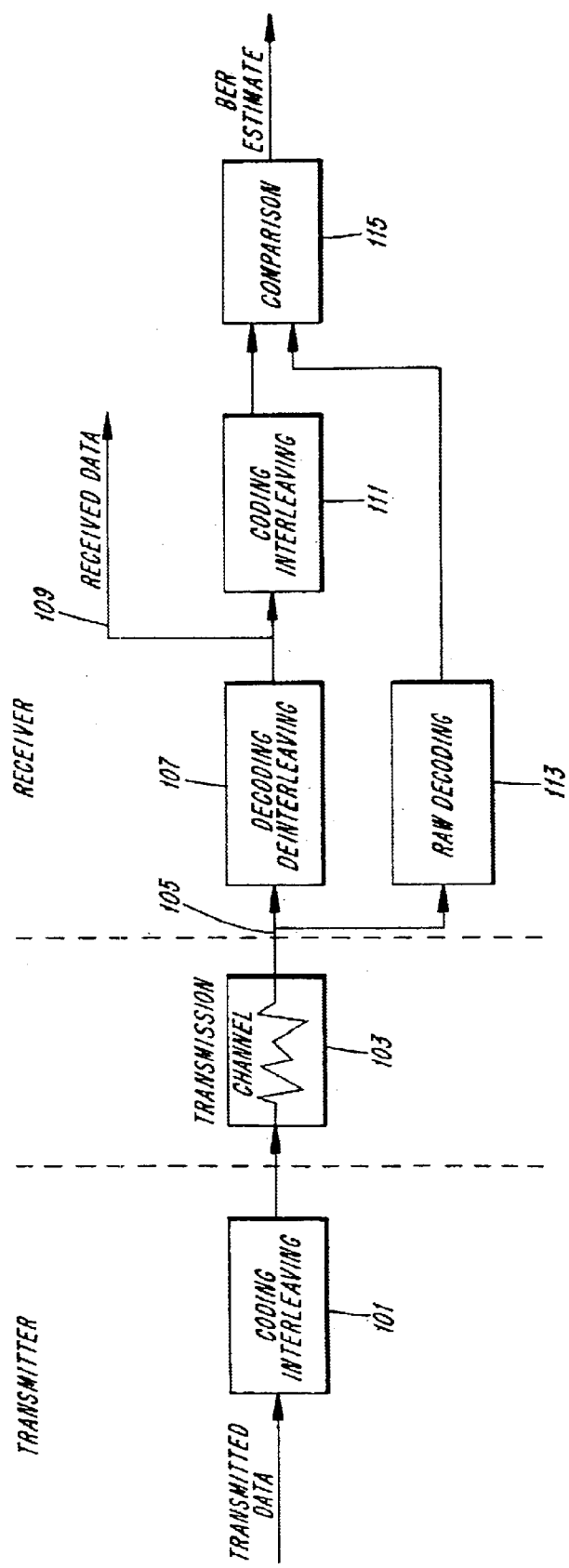
FIG. 1 is a block diagram of a conventional system for generating a BER estimate.

The various features of the invention will now be described with respect to the figures, in which like parts are identified with the same reference characters, The various aspects of the invention will now be described in greater detail in connection with a number of exemplary embodiments. To facilitate an understanding of the invention, many aspects of the invention are described in terms of sequences of actions to be performed by elements of a computerized system. It will be recognized that in each of the embodiments, the various actions could be performed by specialized hard-wired circuits (e.g., discrete logic gates interconnected on one or more integrated circuits to perform a specialized function), by program instructions being executed by one or more programmable processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

As explained earlier, the conventional technique for estimating BER provides an accurate estimate only so long as most of the received erroneous bits can be corrected by means of the error correction coding. If this is not the case, then the conventionally generated BER estimate can be grossly incorrect. To solve this problem, the inventive BER estimation technique uses error detection techniques to determine whether a block of decoded bits includes at least one erroneous bit. If it does, then the BER estimate is set to a value that represents the BER more meaningfully than the BER estimate generated through conventional means.

Figure 2:
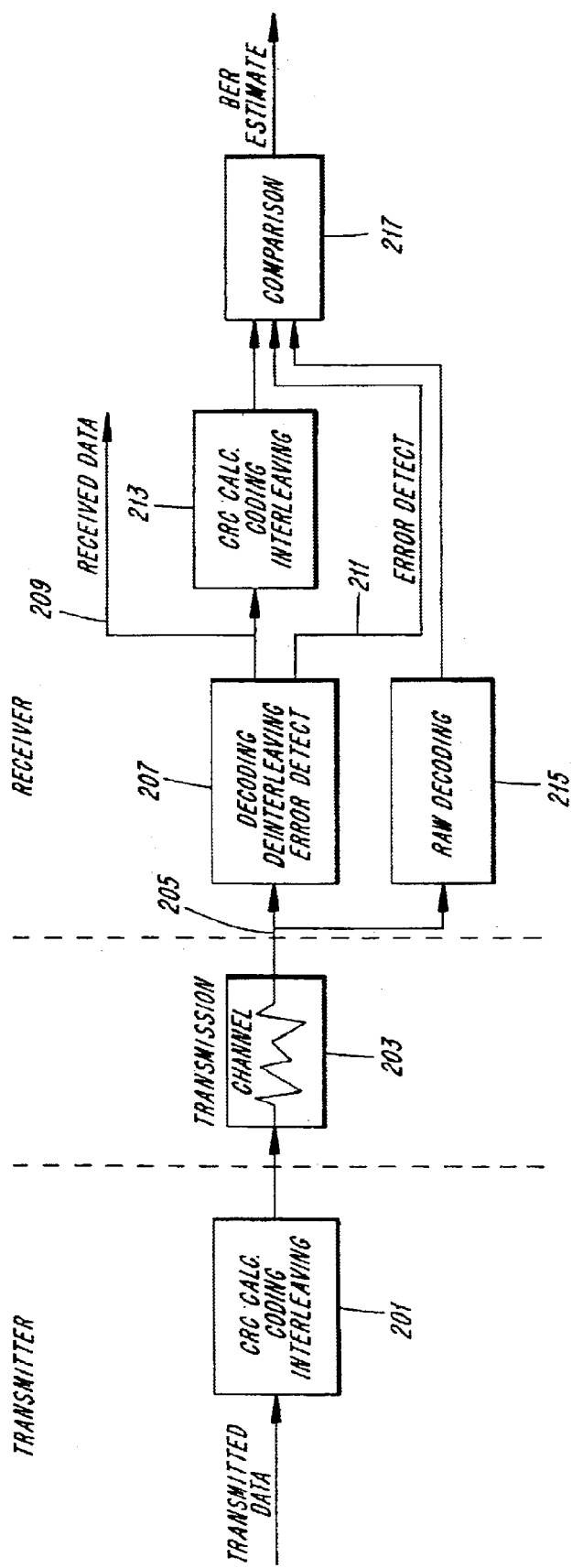
FIG. 2 is a block diagram of a system that employs a BER estimator that operates in accordance with the invention.

The various aspects of the invention will now be described in greater detail with reference to FIG. 2, which is a block diagram of a system that employs a BER estimator that operates in accordance with the invention. At a transmitter, data to be transmitted is supplied to error detection, coding and interleaving logic 201, which generates error detect bits for each block of data to be transmitted, and then generates interleaved FEC bits from the information and error detect bits. These bits are then imposed onto a signal (e.g., by means of binary phase shift keying, BPSK) that is propagated through a channel 203. At a receiver, the received signal 205 is supplied to decoding, deinterleaving and error detect logic 207, which performs deinterleaving and error correction decoding as described above to generate a stream of decoded bits ("Received Data") 209. The error correction decoding technique can include the use of Viterbi processing. The decoded bits 209 are supplied to other circuitry (not shown) in the receiver which uses them for their intended purpose (e.g., generating a loudspeaker signal in a mobile communication device). The decoding, deinterleaving and error detect logic 207 further generates an error detect signal 211 that indicates whether the decoded bits 209 include at least one erroneous bit. The generation of the error detect signal 211 may, for example, be based on a comparison of receiver-generated CRC bits with received CRC bits that had been added to the information bits by the transmitter prior to error correction coding and interleaving. If the two sets do not match, then an error is indicated.

For purposes of generating the BER estimate, the decoded bits 209 are also supplied to error detection, coding and interleaving logic 213 that essentially duplicates the process performed by the transmitter's error detection, coding and interleaving logic 201, except that the receiver performs these operation on the decoded bits 209.

In parallel with the receiver's decoding, deinterleaving and error detect logic 207 and error detection, coding and interleaving logic 213, the received signal 205 is supplied to raw decoding logic 215, which merely generates 1's and 0's from the received signal 205, but does not perform any error correction or deinterleaving. The output bit stream supplied by the raw decoding logic 215 is then supplied to one input of comparison logic 217. Another input of the comparison logic 217 receives the output bit stream supplied by the receiver's error detection, coding and interleaving logic 213. A third input of the comparison logic 217 receives the error detection signal 211 generated by the decoding, deinterleaving and error detect logic 207. In accordance with one aspect of the invention, the comparison logic 217 examines the error detect signal 211. If no error is indicated, then the comparison circuit 217 calculates, for a given block of received bits, how many differences there were between the values supplied by the receiver's error detection, coding and interleaving logic 213 and the raw decoding logic 215. In these instances, this count represents the BER estimate.

However, if the error detect signal 211 indicates that the decoded block of bits includes at least one error, then a more meaningful measure of the BER is used instead. In one exemplary embodiment of the invention, this involves substituting a previously generated BER estimate in place of one that would be calculated for this block of bits. In an alternative embodiment, a BER prediction algorithm could be used to generate a BER estimate that is used in place of one actually calculated for this block of bits. Such a prediction algorithm might, for example, base its prediction on previously generated BER estimates.

The above-described aspect of the invention solves the problem that occurs when an error-free block of decoded bits cannot be generated from received signal 205. In another aspect of the invention, it is recognized that if the signal to noise ratio were to drop drastically for a period of time, then there could be a relatively long sequence of received data blocks that each include at least one erroneous bit value. If the above-described strategy were to be adopted under these conditions, a single BER estimate would be held for the entire period of time. In this case, the BER estimate would be underestimated, which could be dangerous in a power control situation.

In accordance with another aspect of the invention, a predetermined BER estimate is substituted for the calculated one under conditions of successive uncorrectable errors in received data blocks. The number of successive blocks that would invoke this procedure could, for example, be four. In such cases, the predetermined BER estimate is preferably set to a value that is higher than a reference value used in the power control algorithm. For example, the BER estimate may be set to a value of 50%. The goal of such a setting is to make it high enough that the power control mechanism will recognize that adjustments need to be made to reduce the BER.

Figure 3:
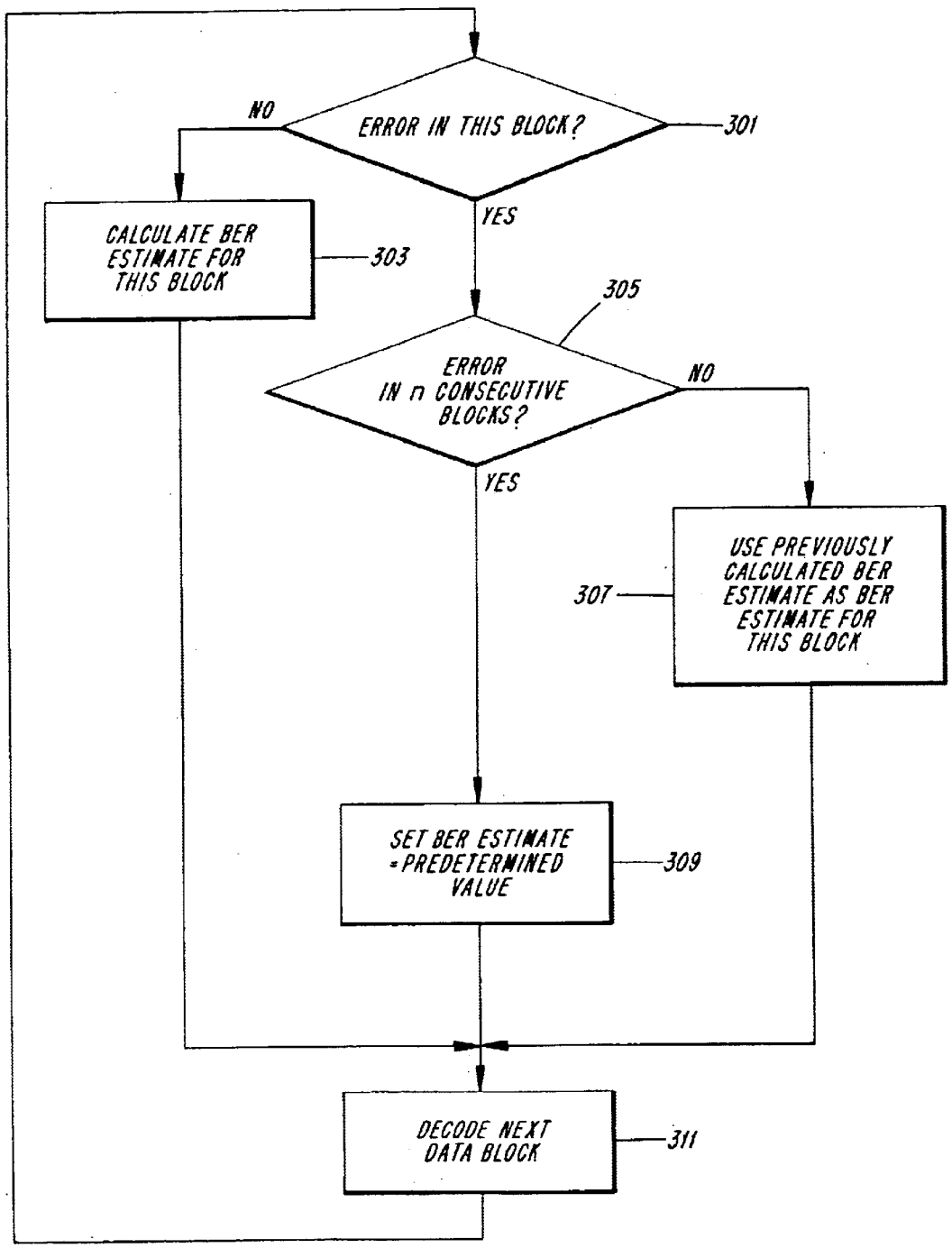
FIG. 3 is a flow chart that illustrates the functioning of comparison logic that generates a BER estimate in accordance with the invention.

FIG. 3 is a flow chart that illustrates the functioning of the comparison logic 217. The supplied error detect signal 211 is tested to determine whether a current decoded data block includes at least one erroneous bit value (step 301). If the current decoded data block does not include at least one erroneous bit value ("NO" path out of decision block 301), then the BER estimate is calculated for the current decoded data block, utilizing known BER estimation techniques (step 303). Following this step, a next block of received data is decoded (step 311), and the process is repeated.

If the current decoded data block does include at least one erroneous bit value ("YES" path out of decision block 301), then a test is made to determine whether this erroneous block is an nth consecutive erroneous data block (decision block 305). For example, n could be set equal to four.

If the current erroneous data block is not an nth consecutive erroneous data block ("NO" path out of decision block 305), then a previously calculated BER estimate is used as the BER estimate for this data block (step 307). For example, where the current data block is an ith data block, the previously calculated BER estimate could be the one calculated for the (i−1)th data block. Following this step, a next block of received data is decoded (step 311), and the process is repeated.

Returning to decision block 305, if the current erroneous data block is an nth consecutive erroneous data block ("YES" path out of decision block 305), then the BER estimate is simply set equal to a predetermined value, such as 50% (step 309). The predetermined value is preferably set high enough to cause the power control mechanism to take responsive measures to reduce the BER. Following this step, a next block of received data is decoded (step 311), and the process is repeated.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of generating a bit error rate estimate for a received signal, the method comprising:

using, by a decoder, an error correction decoding technique to generate a block of decoded bits from the received signal;

using an error detection technique to determine whether at least one of the decoded bits from the block of decoded bits has an erroneous value;

if none of the decoded bits from the block of decoded bits has an erroneous value, then calculating the bit error rate estimate from the received signal; and if at least one of the decoded bits from the block of decoded bits has an erroneous value, then setting the bit error rate estimate equal to a value that is based on a previously calculated bit error rate, wherein the previously calculated bit error rate is calculated using a previously received signal.

2. The method of claim 1, wherein the step of calculating the bit error rate from the received signal comprises:

using the error detection technique to generate error detection information from the block of decoded bits;

processing the block of decoded bits and the error detection information to generate a synthesized block of coded bits, wherein the processing includes using an error correction coding technique that corresponds to the error correction decoding technique;

using a non-error correction decoding technique to generate a block of raw decoded bits from the received signal;

comparing each bit of the synthesized block of coded bits with a corresponding bit of the block of raw decoded bits; and setting the bit error rate estimate equal to a value that represents how many bits of the synthesized block of coded bits are not equal to the corresponding bits of the block of raw decoded bits.

3. The method of claim 1, wherein the step of setting the bit error rate estimate equal to the value that is based on the previously calculated bit error rate comprises:

setting the bit error rate estimate equal to a value that is equal to the previously calculated bit error rate.

4. The method of claim 1, wherein the error detection technique includes calculating a cyclic redundancy check.

5. The method of claim 1, wherein the error correction decoding technique includes using Viterbi processing.

6. The method of claim 1, wherein the step of using the error correction decoding technique to generate the block of decoded bits from the received signal comprises:

deinterleaving the received signal to generate a deinterleaved received signal; and using the error correction decoding technique to generate the block of decoded bits from the deinterleaved received signal.

7. The method of claim 1, wherein the step of setting the bit error rate estimate equal to the value that is based on the previously calculated bit error rate if at least one of the decoded bits from the block of decoded bits has an erroneous value comprises:

setting the bit error rate estimate equal to a predetermined value that is not based on the previously calculated bit error rate if the block of decoded bits is at least an nth consecutively received block of decoded bits having at least one decoded bit that has an erroneous value, wherein n is a number greater than one; and otherwise setting the bit error rate estimate equal to the value that is based on the previously calculated bit error rate if at least one of the decoded bits from the block of decoded bits has en erroneous value.

8. The method of claim 7, wherein the predetermined value is greater than or equal to a reference value used in a power control algorithm.

9. A method of generating a bit error rate estimate for a received signal, the method comprising:
  using, by a decoder, an error correction decoding technique to generate a block of decoded bits from the received signal;
  using an error detection technique to determine whether at least one of the decoded bits from the block of decoded bits has an erroneous value;
  if none of the decoded bits from the block of decoded bits has an erroneous value, then calculating the bit error rate estimate from the received signal; and
  if at least one of the decoded bits from the block of decoded bits has an erroneous value, then setting the bit error rate estimate equal to a value that is predicted from one or more previously calculated bit error rates.

10. An apparatus for generating a bit error rate estimate for a received signal, the apparatus comprising:
  logic that uses an error correction decoding technique to generate a block of decoded bits from the received signal;
  logic that uses an error detection technique to determine whether at least one of the decoded bits from the block of decoded bits has an erroneous value;
  logic that calculates the bit error rate estimate from the received signal if none of the decoded bits from the block of decoded bits has an erroneous value; and
  logic that sets the bit error rate estimate equal to a value that is based on a previously calculated bit error rate if at least one of the decoded bits from the block of decoded bits has an erroneous value, wherein the previously calculated bit error rate is calculated using a previously received signal.

11. The apparatus of claim 10, wherein the logic that calculates the bit error rate from the received signal comprises:
  logic that uses the error detection technique to generate error detection information from the block of decoded bits;
  processing logic that processes the block of decoded bits and the error detection information to generate a synthesized block of coded bits, wherein the processing logic includes logic that uses an error correction coding technique that corresponds to the error correction decoding technique;
  logic that uses a non-error correction decoding technique to generate a block of raw decoded bits from the received signal;
  logic that compares each bit of the synthesized block of coded bits with a corresponding bit of the block of raw decoded bits; and
  logic that sets the bit error rate estimate equal to a value that represents how many bits of the synthesized block of coded bits are not equal to the corresponding bits of the block of raw decoded bits.

12. The apparatus of claim 10, wherein the logic that sets the bit error rate estimate equal to the value that is based on the previously calculated bit error rate comprises:
  logic that sets the bit error rate estimate equal to a value that is equal to the previously calculated bit error rate.

13. The apparatus of claim 10, wherein the error detection technique includes calculating a cyclic redundancy check.

14. The apparatus of claim 10, wherein the logic that uses the error correction decoding technique includes a Viterbi decoder.

15. The apparatus of claim 10, wherein the logic that uses the error correction decoding technique to generate the block of decoded bits from the received signal comprises:
  a deinterleaver that deinterleaves the received signal to generate a deinterleaved received signal; and
  logic that uses the error correction decoding technique to generate the block of decoded bits from the deinterleaved received signal.

16. The apparatus of claim 10, wherein the logic that sets the bit error rate estimate equal to the value that is based on the previously calculated bit error rate if at least one of the decoded bits from the block of decoded bits has an erroneous value comprises:
  logic that:
    sets the bit error rate estimate equal to a predetermined value that is not based on the previously calculated bit error rate if the block of decoded bits is at least an nth consecutively received block of decoded bits having at least one decoded bit that has an erroneous value, wherein n is a number greater than one; and
    otherwise sets the bit error rate estimate equal to the value that is based on the previously calculated bit error rate if at least one of the decoded bits from the block of decoded bits has an erroneous value.

17. The apparatus of claim 16, wherein the predetermined value is greater than or equal to a reference value used in a power control algorithm.

18. An apparatus for generating a bit error rate estimate for a received signal, the apparatus comprising:
  logic that uses an error correction decoding technique to generate a block of decoded bits from the received signal;
  logic that uses an error detection technique to determine whether at least one of the decoded bits from the block of decoded bits has an erroneous value;
  logic that calculates the bit error rate estimate from the received signal if none of the decoded bits from the block of decoded bits has an erroneous value; and
  logic that sets the bit error rat estimate equal to a value that is predicted from one or more previously calculated bit error rates if at least one of the decoded bits from the block of decoded bits has an erroneous value.

* * * * *

UNITED STATES PATENT AND TRADEMARK OFFICE
CERTIFICATE OF CORRECTION

PATENT NO. : 6,848,065 B1  
APPLICATION NO. : 09/598210  
DATED : January 25, 2005  
INVENTOR(S) : Johan Nilsson It is certified that error appears in the above-identified patent and that said Letters Patent is hereby corrected as shown below:

Column 3, Line 40: Change "bow" to --how--

Claim 7, Line 15: Change "en" to --an--

Signed and Sealed this

Fifth Day of September, 2006

JON W. DUDAS  
*Director of the United States Patent and Trademark Office*